(12) United States Patent
Herbert et al.

(10) Patent No.: US 9,051,440 B2
(45) Date of Patent: Jun. 9, 2015

(54) PROCESS FOR PRODUCING DISPERSIBLE POWDERS

(75) Inventors: Michael Herbert, Burghausen (DE); Jochen Ring, Herxheim (DE); Stefan Killat, Burghausen (DE); Bernd Gerstenberger, Burghausen (DE)

(73) Assignee: WACKER CHEMIE AG, Munich (DE)

( * ) Notice: Subject to any disclaimer, the term of this patent is extended or adjusted under 35 U.S.C. 154(b) by 0 days.

(21) Appl. No.: 14/236,563

(22) PCT Filed: Jul. 23, 2012

(86) PCT No.: PCT/EP2012/064430
§ 371 (c)(1),
(2), (4) Date: Jan. 31, 2014

(87) PCT Pub. No.: WO2013/017463
PCT Pub. Date: Feb. 7, 2013

(65) Prior Publication Data
US 2014/0167299 A1   Jun. 19, 2014

(30) Foreign Application Priority Data

Aug. 1, 2011   (DE) .................. 10 2011 080 233

(51) Int. Cl.
*B01J 2/04* (2006.01)
*B01J 2/30* (2006.01)
*C08J 3/12* (2006.01)

(52) U.S. Cl.
CPC .. *C08J 3/124* (2013.01); *B01J 2/04* (2013.01); *B01J 2/30* (2013.01); *C08J 3/122* (2013.01); *C08J 3/128* (2013.01)

(58) Field of Classification Search
None
See application file for complete search history.

(56) References Cited

U.S. PATENT DOCUMENTS

| 3,883,489 | A | 5/1975 | Matschke et al. |
| 4,481,328 | A | 11/1984 | Harréus et al. |
| 6,020,403 | A | 2/2000 | Eck et al. |
| 2002/0150528 | A1 | 10/2002 | Maus et al. |
| 2004/0198896 | A1 | 10/2004 | Pakusch et al. |
| 2008/0098933 | A1 | 5/2008 | Killat |

FOREIGN PATENT DOCUMENTS

| DE | 88493 A1 | 3/1972 |
| DE | 2 214 410 | 10/1973 |
| DE | 31 01 413 | 7/1982 |
| DE | 19542442 A1 | 5/1997 |
| DE | 10105750 A1 | 10/2002 |
| DE | 102006050336 A1 | 8/2008 |

(Continued)

OTHER PUBLICATIONS

English language patent abstract corresponding to DD 88493 A1.

(Continued)

*Primary Examiner* — Mary F Theisen
(74) *Attorney, Agent, or Firm* — RatnerPrestia (57) ABSTRACT

A process for producing dispersible powders by spray-drying aqueous polymer dispersions and adding antiblocking agent, wherein antiblocking agents present in agglomerated form and having a particle size from 10 μm to 250 μm, or having a particle size from 5 mm to 5 cm in the case of agglomerates in the form of extrudates, are fed in whole or in part by a transport gas into the spray-drying device and are comminuted to a particle size from 0.01 μm to 5 μm, or, in the case of extrudates, to a particle size from 2 μm to 60 μm.

11 Claims, 2 Drawing Sheets

(56) References Cited

FOREIGN PATENT DOCUMENTS

| EP | 0690278 A1 | 1/1996 |
| EP | 1 000 113 | 7/2002 |
| EP | 1464665 A1 | 10/2004 |
| EP | 1 916 275 | 4/2008 |

OTHER PUBLICATIONS

English language patent abstract corresponding to EP 0 690 278 A1.

PROCESS FOR PRODUCING DISPERSIBLE POWDERS

CROSS REFERENCE TO RELATED APPLICATIONS

This application is the national phase filing of international patent application No. PCT/EP2012/064430, filed 23 Jul. 2012, and claims priority of German application number 10 2011 080233.9, filed 1 Aug. 2011, the entireties of which applications are incorporated herein by reference.

FIELD OF THE INVENTION

The invention relates to a process for producing dispersion powders by means of spray-drying of aqueous polymer dispersions and addition of antiblocking agent.

BACKGROUND OF THE INVENTION

Dispersion powders are polymer powders obtainable by spray-drying the corresponding aqueous polymer dispersions. A distinction is made here between dispersion powders which are redispersible in water and those which do not have this property. Water-redispersible polymer powders are generally obtained by drying the corresponding aqueous polymer dispersions in the presence of a drying aid (generally a protective colloid) and of antiblocking agent. Because of the protective colloid content, irreversible adhesion of the polymer particles is firstly prevented in the course of the drying operation, since the polymer particles are encased by the water-soluble protective colloid particles. Secondly, this protective colloid matrix, which redissolves when the polymer powder is dispersed in water, has the effect that the polymer particles are again present in the aqueous redispersion with the particle size of the starting dispersion.

To minimize powder blocking, especially in the case of dispersion powders based on polymers having a glass transition temperature Tg of <25° C., and to improve the free flow and flowability, antiblocking agents (anticaking agents) are added to the dispersion powders in the course of production thereof.

The antiblocking agent (ABA) serves to ensure free flow and storage stability of the polymer powder obtained after spray drying (dispersion powder). Antiblocking agents are an essential constituent of the dispersion powder especially when blocking of the powder or caking on the dryer wall are to be expected because of a low glass transition temperature of the polymer or high hygroscopicity. The powdering of the particle surface with antiblocking agent, because of relatively low agglomerate formation, more particularly, also reduces the proportion of coarse particles, which has a very advantageous effect on the overall drying operation and on the properties of the powder (for example free flow and storage stability).

Dispersion powders of this kind are used in many kinds of applications, including in coating compositions and in adhesives for a wide variety of different substrates. One example is use as a binding powder for particulate natural materials (Vinnex® powders from Wacker Chemie AG). The use thereof in chemical products for construction is widespread, frequently in conjunction with mineral binders (Vinnapas® powders from Wacker Chemie AG). Examples thereof are construction adhesives, especially tile adhesives, renders and mortar compounds, paints, spackling compounds, leveling compounds, thermal insulation composite systems and jointing mortars. The advantage of the water-redispersible dispersion powders lies particularly in the option of using them in prefabricated, storable dry mixes, optionally together with mineral binders such as cement, and of making them ready for use only immediately before use by addition of water. Dry mixes of this kind can be more easily transported (without a water content) compared to systems in paste form and offer advantages in storage, for example insensitivity to frost and resistance to microbe infestation.

DE-A 2214410 recommends metering the antiblocking agent into the spray tower in dry form, simultaneously with but separately from the aqueous polymer dispersion. Antiblocking agents having a mean particle size of 0.01 to 0.5 µm are recommended, since the finer the antiblocking agents the smaller the amount used. DE 3101413 C2 recommends hydrophobic silica having a particle size of 10 to 50 nm as an antiblocking agent. The addition is effected during the spray-drying in a mixture with the drying gas. In EP 690278 A1, the antiblocking agent is introduced with the drying gas below the atomizer disk of a disk atomization dryer. In the process from EP 1000113 B1, a mixture of hydrophobic and hydrophilic antiblocking agent is blown in in dry form during the atomization of the polymer dispersion.

In practice, the antiblocking agents are frequently in agglomerated form. This may, for instance in the case of precipitated or fumed silicas, be caused by the production process or exist as a material property. In other cases, for example in the case of use of kaolin, the agglomerate form is deliberately produced in the course of production by spray-drying an aqueous suspension of the antiblocking agent. This gives antiblocking agents with good free-flow properties, which can be conveyed without any problem and do not show any tendency to blocking or bridge formation in storage silos, which leads to significant advantages in the running of the process. A further advantage can be the higher bulk density of the agglomerated antiblocking agents, which is advantageous especially in the logistics sector. Such agglomerates, for example of kaolin, generally have a particle size of 10 to 250 µm, while the primary particles are about 0.01 to 5 µm in size (mean particle or agglomerate diameter determined by means of laser granulometry or scanning electron microscopy, SEM). Antiblocking agents in agglomerated form are also produced by means of extrusion processes, for example by extrusion of a highly concentrated aqueous suspension of antiblocking agent particles and subsequent drying. In this case, the agglomerates have particle sizes (mean agglomerate diameters) generally of 5 mm up to 5 cm.

From a process point of view, as mentioned, the use of the antiblocking agent in agglomerated form is preferable. However, a disadvantage of this form is that the surface area of the agglomerated antiblocking agent is reduced compared to the primary particles. This is the case irrespective of whether the agglomerate form is an intrinsic property of the antiblocking agent or has been deliberately generated by the manufacturer. Therefore, fewer antiblocking agent particles are available for powdering of the polymer powders, which makes the antiblocking agent less efficient. One option would be to mill the antiblocking agent by means of a solids mill and then to introduce it into the drying process. A disadvantage here is that the flowability of the ground antiblocking agent is again poor, combined with the disadvantages already mentioned in the process.

SUMMARY OF THE INVENTION

The problem addressed was thus that of providing a process with which it is possible to provide dispersion powders with finely divided antiblocking agents without having to lose the advantages of antiblocking agents in agglomerated form in the course of storage thereof and in the course of handling and processing thereof.

DETAILED DESCRIPTION OF THE INVENTION

The invention provides a process for producing dispersion powders by means of spray-drying of aqueous polymer dispersions and addition of antiblocking agent, characterized in that antiblocking agents present in agglomerated form and having a particle size of 10 µm to 250 µm, or having a particle size of 5 mm to 5 cm in the case of agglomerates in the form of extrudates, are supplied to the spray-drying wholly or partly by means of a conveying gas and are comminuted to a particle size of 0.01 µm to 5 µm or, in the case of extrudates, to a particle size of 2 µm to 60 µm.

The base polymers for the dispersion powders are introduced in the form of aqueous polymer dispersions thereof for the spray-drying. Suitable base polymers for the dispersion powders are those based on one or more ethylenically unsaturated monomers selected from the group comprising vinyl esters of carboxylic acids having 1 to 15 carbon atoms, methacrylic esters or acrylic esters of carboxylic acids with unbranched or branched alcohols having 1 to 15 carbon atoms, olefins or dienes, vinylaromatics or vinyl halides.

Preferred vinyl esters are vinyl acetate, vinyl propionate, vinyl butyrate, vinyl 2-ethylhexanoate, vinyl laurate, 1-methylvinyl acetate, vinyl pivalate and vinyl esters of alpha-branched monocarboxylic acids having 5 to 13 carbon atoms, for example VeoVa9® or VeoVa10® (trade names of Momentive). Particular preference is given to vinyl acetate.

Preferred methacrylic esters or acrylic esters are esters of unbranched or branched alcohols having 1 to 15 carbon atoms, such as methyl acrylate, methyl methacrylate, ethyl acrylate, ethyl methacrylate, propyl acrylate, propyl methacrylate, n-butyl acrylate, n-butyl methacrylate, 2-ethylhexyl acrylate, norbornyl acrylate. Particular preference is given to methyl acrylate, methyl methacrylate, n-butyl acrylate and 2-ethylhexyl acrylate.

Preferred olefins or dienes are ethylene, propylene and 1,3-butadiene. Preferred vinylaromatics are styrene and vinyltoluene. A preferred vinyl halide is vinyl chloride.

It is optionally also possible to copolymerize 0.05 to 50% by weight, preferably 1 to 10% by weight, based on the total weight of the base polymer, of auxiliary monomers. Examples of auxiliary monomers are ethylenically unsaturated mono- and dicarboxylic acids, ethylenically unsaturated carboxamides, ethylenically unsaturated sulfonic acids or salts thereof, precrosslinking comonomers such as polyethylenically unsaturated comonomers, postcrosslinking comonomers such as N-methylolacrylamide, epoxy-functional comonomers, silicon-functional comonomers.

Examples of suitable homo- and copolymers are vinyl acetate homopolymers, copolymers of vinyl acetate with ethylene, copolymers of vinyl acetate with ethylene and one or more further vinyl esters, copolymers of vinyl acetate with one or more further vinyl esters, copolymers of vinyl acetate with ethylene and acrylic esters, copolymers of vinyl acetate with ethylene and vinyl chloride, copolymers of vinyl chloride and ethylene and optionally one or more further vinyl esters, styrene-acrylic ester copolymers, styrene-1,3-butadiene copolymers.

Preference is given to vinyl acetate homopolymers; copolymers of vinyl acetate with 1 to 50% by weight of one or more further comonomers from the group of the vinyl esters having 1 to 12 carbon atoms in the carboxyl radical, such as vinyl propionate, vinyl laurate, vinyl esters of alpha-branched carboxylic acids having 5 to 13 carbon atoms, such as VeoVa9®, VeoVa10®, VeoVa11®; copolymers of vinyl acetate with 1 to 40% by weight of ethylene; copolymers of vinyl acetate with 1 to 40% by weight of ethylene and 1 to 50% by weight of one or more further comonomers from the group of the vinyl esters having 1 to 12 carbon atoms in the carboxyl radical, such as vinyl propionate, vinyl laurate, vinyl esters of alpha-branched carboxylic acids having 5 to 13 carbon atoms, such as VeoVa9®, VeoVa10®, VeoVa11®; copolymers of vinyl acetate, 1 to 40% by weight of ethylene and preferably 1 to 60% by weight of (meth)acrylic esters of unbranched or branched alcohols having 1 to 15 carbon atoms, especially methyl methacrylate, methyl acrylate, n-butyl acrylate or 2-ethylhexyl acrylate; and copolymers with 30 to 75% by weight of vinyl acetate, 1 to 30% by weight of vinyl laurate or vinyl esters of an alpha-branched carboxylic acid having 5 to 13 carbon atoms, and 1 to 30% by weight of (meth)acrylic esters of unbranched or branched alcohols having 1 to 15 carbon atoms, especially methyl methacrylate, methyl acrylate, n-butyl acrylate or 2-ethylhexyl acrylate, which may also contain 1 to 40% by weight of ethylene; copolymers with one or more vinyl esters having 1 to 12 carbon atoms in the carboxyl radical, such as vinyl acetate, vinyl propionate, vinyl laurate, vinyl esters of alpha-branched carboxylic acids having 5 to 13 carbon atoms, such as VeoVa9®, VeoVa10®, VeoVa11®, 1 to 40% by weight of ethylene and 1 to 60% by weight of vinyl chloride; where the polymers may each also contain the auxiliary monomers mentioned in the amounts mentioned, and the figures in % by weight add up to 100% by weight in each case.

Preference is also given to (meth)acrylic ester polymers, such as copolymers of n-butyl acrylate or 2-ethylhexyl acrylate or copolymers of methyl methacrylate with n-butyl acrylate and/or 2-ethylhexyl acrylate and optionally ethylene; styrene-acrylic ester copolymers with one or more monomers from the group of methyl acrylate, ethyl acrylate, propyl acrylate, n-butyl acrylate, 2-ethylhexyl acrylate; styrene-1,3-butadiene copolymers; where the polymers may also contain the auxiliary monomers mentioned in the amounts mentioned, and the figures in % by weight add up to 100% by weight in each case.

The monomer selection and the selection of the proportions by weight of the comonomers is generally made so as to result in a glass transition temperature Tg of −50° C. to +50° C. The glass transition temperature Tg of the polymers can be determined in a known manner by means of differential scanning colorimetry (DSC). The Tg can also be calculated beforehand as an approximation by means of the Fox equation. According to Fox T. G., Bull. Am. Physics Soc. 1, 3, page 123 (1956): $1/Tg = x_1/Tg_1 + x_2/Tg_2 + \ldots + x_n/Tg_n$, where $x_n$ is the mass fraction (% by wt./100) of the monomer n, and $Tg_n$ is the glass transition temperature in Kelvin of the homopolymer of the monomer n. Tg values for homopolymers are listed in Polymer Handbook 2nd Edition, J. Wiley & Sons, New York (1975).

The base polymers are preferably prepared by the emulsion polymerization process. The polymerization temperature is preferably between 40° C. and 100° C., more preferably between 60° C. and 90° C. In the copolymerization of gaseous comonomers such as ethylene, 1,3-butadiene or vinyl chloride, it is also possible to work under pressure, generally between 5 bar and 100 bar.

The polymerization is preferably initiated with the water-soluble initiators or redox initiator combinations which are commonly used for emulsion polymerization.

The polymerization is effected in the presence of protective colloids and/or emulsifiers. Suitable protective colloids for the polymerization are polyvinyl alcohols; polyvinyl acetals; polyvinylpyrrolidones; polysaccharides in water-soluble form, such as starches (amylose and amylopectin), celluloses and the carboxymethyl, methyl, hydroxyethyl, hydroxypropyl derivatives thereof, dextrins and cyclodextrins; proteins such as casein or caseinate, soya protein, gelatin; lignosulfonates; synthetic polymers such as poly(meth)acrylic acid, copolymers of (meth)acrylates with carboxy-functional comonomer units, poly(meth)acrylamide, polyvinylsulfonic acids and the water-soluble copolymers thereof; melamine-formaldehydesulfonates, naphthalene-formaldehydesulfonates, styrene-maleic acid and vinyl ether-maleic acid copolymers. Preference is given to using partly hydrolyzed or fully hydrolyzed polyvinyl alcohols having a hydrolysis level of 80 to 100 mol %, especially partly hydrolyzed polyvinyl alcohols having a hydrolysis level of 80 to 95 mol % and a Höppler viscosity of 1 to 30 mPas (Höppler method at 20° C., DIN 53015) in 4% aqueous solution.

If polymerization is effected in the presence of emulsifiers, the amount thereof is 1 to 5% by weight, based on the amount of monomers. Suitable emulsifiers are anionic, cationic or nonionic emulsifiers, for example anionic surfactants such as alkyl sulfates having a chain length of 8 to 18 carbon atoms, alkyl or alkylaryl ether sulfates having 8 to 18 carbon atoms in the hydrophobic radical and up to 40 ethylene oxide or propylene oxide units, alkyl- or alkylarylsulfonates having 8 to 18 carbon atoms, esters and monoesters of sulfosuccinic acid with monohydric alcohols or alkylphenols, or nonionic surfactants such as alkyl polyglycol ethers or alkylaryl polyglycol ethers having 8 to 40 ethylene oxide units.

On completion of the polymerization, residual monomers can be removed by postpolymerization employing known methods, generally by redox catalyst-initiated postpolymerization. Volatile residual monomers can also be removed by means of distillation, preferably under reduced pressure, and optionally while passing inert entraining gases through or over, such as air, nitrogen or water vapor.

The aqueous polymer dispersions thus obtainable have a solids content of 30 to 75% by weight, preferably of 50 to 60% by weight.

The production process for the polymer dispersion is described, for example, in EP 1916275 A1, the details from which in this regard form part of the application (incorporated here by reference).

For production of the dispersion powders, the aqueous dispersions are dried by means of spray-drying in the presence of antiblocking agent, optionally after addition of protective colloids as a drying aid to the polymer dispersion. In general, the drying aid (protective colloid) is used in a total amount of 0.5 to 30% by weight, based on the polymeric constituents of the dispersion. Suitable drying aids are the substances enumerated above as protective colloids. Further constituents of the dispersion powders which may be added to the polymer dispersion are further additives, for example defoamers, hydrophobizing agents and rheological additives. The polymer dispersion modified with protective colloid and optionally further additives, i.e. the mixture of polymer dispersion, protective colloid and optionally further additives to be dried, is also referred to in the technical jargon as "feed".

Suitable antiblocking agents (anticaking agents) are known to those skilled in the art, for example aluminum silicates such as kaolin, bentonite, fumed silica or precipitated silica, which may optionally be hydrophobized, talc, clays, calcium sulfate, carbonates such as calcium carbonate, magnesium carbonate and Ca/Mg carbonate, barium sulfate. It is also possible to use mixtures of antiblocking agents. The antiblocking agents are used generally in an amount of 0.1 to 30% by weight, preferably 2 to 30% by weight, more preferably 7 to 30% by weight, based in each case on the total weight of the polymeric constituents of the polymer dispersion to be atomized. In the case of fumed silica or precipitated silica, preferably 0.1 to 2% by weight, based on the polymeric constituents of the polymer dispersion to be atomized, is used. The proportion of the polymeric constituents in the polymer dispersion to be atomized is composed of the base polymer of the polymer dispersion and the protective colloid component.

Antiblocking agent agglomerates produced by means of extrusion are generally present in particle sizes of 5 mm to 5 cm, while non-extruded antiblocking agents are generally traded as agglomerates having a particle size of 10 μm to 250 μm. The particle size in the case of the extrudates having a particle size of generally 5 mm to 5 cm can be measured by means of a ruler or slide rule, measuring the length of the extrudates as the particle size. The particle size of agglomerates in the μm range can be measured by means of laser granulometry and is reported as the mean agglomerate diameter. The mean agglomerate diameter can be determined with the dry agglomerates by means of a scattered light measurement in a Beckman Coulter LS 130 laser particle analyzer. The advantages of the agglomerate form lie, as already mentioned, in better conveyability and free flow, less bridge formation and blocking in silos, and, under some circumstances, in a higher bulk density of the antiblocking agents.

The spray-drying is effected in customary spray-drying systems (atomization dryers), in which the energy for vaporization of the aqueous phase is transferred from the drying gas to the polymer dispersion (feed) to be dried by conduction of heat. The drying is effected by intimate mixing of the polymer dispersion sprayed with the drying gas. The drying gas used is generally air.

To accelerate the drying, the drying gas is preheated, preferably to an inlet temperature of 130° C. to 210° C. (hot air). Preferably, the polymer dispersion (feed) to be dried is also preheated, generally to a feed temperature of 50° C. to 98° C. The spray-drying is effected by the cocurrent principle or the countercurrent principle. In the preferred countercurrent principle, the polymer dispersion (feed) is atomized, generally at the upper end of the dryer by means of a one-phase nozzle under pressure, generally 25 to 100 bar, or atomized together with compressed air (pressure 2 to 10 bar) by means of a two-phase nozzle or multiphase nozzle, or atomized by means of an atomizer disk (rotary atomizer). The polymer dispersion and the drying gas are fed in at the upper end of the spray dryer, generally a cylindrical tower (dryer tower) having a volume of up to several hundred cubic meters. At the lower end, the dried polymer powder is discharged with the drying gas and isolated by means of a filter precipitator and/or cyclone precipitator. The outlet temperature of the drying gas is about 45° C. to 120° C., according to the system, Tg of the resin and desired drying level.

The antiblocking agent is added continuously and simultaneously, but spatially separately from the polymer dispersion to be atomized (feed). For this purpose, all or some of the antiblocking agent is conveyed into the dryer tower in a conveying line by means of a conveying gas, generally air (conveying air). The conveying gas velocity is generally 20 to 50 m/s, preferably 30 to 50 m/s. Alternatively, all or some of the antiblocking agent can be added via the conveying line mentioned to the hot air supplied for drying in the hot air channel. In general, a proportion of 50 to 100% by weight of the antiblocking agent present in agglomerated form is supplied to the spray-drying, preferably a proportion of 80 to 100% by weight, most preferably about 100% by weight. The proportion of antiblocking agent which is not supplied to the spray-drying can be added subsequently to the dried dispersion powder.

The comminution of the antiblocking agent is effected in the conveying line by means of an impact mill (whirlwind mill), in which case the step of grinding the antiblocking agent conveyed with conveying gas is effected in-line in the conveying line. Such impact mills are commercially available, for example from Grenzebach Maschinenbau GmbH. The use of an impact mill is especially preferred when the conveying gas for conveying the antiblocking agent is introduced with relatively low conveying gas velocity, preferably <20 m/s, more preferably <15 m/s, for example by means of ventilator conveying.

Alternatively, the deagglomeration of the antiblocking agent can be effected by directing the antiblocking agent onto one or more impact plates. The impact plates may be mounted in the antiblocking agent conveying line and/or in the hot air channel for supply of the drying gas and/or in the drying tower. The geometry of these impact plate(s) is matched to the dryer and the atomization process. The impact plates may have, for example, rectangular, circular or annular geometry. They may be flat or curved. Impact plates are generally manufactured from metal (steel). The dimensions are selected such that the antiblocking agent/air stream supplied substantially completely hits the impact plate(s). Preference is given to flow toward one or more vertical circular impact plates. The momentum thus generated destroys the antiblocking agent agglomerates and finely divides the antiblocking agent, which is in the form of the primary particles only immediately before contact with the spray (feed droplets). This results simultaneously in the advantages of good conveyability and high surface area of the deagglomerated antiblocking agent, which is necessary for effective coverage of the powder particles.

A further alternative to the deagglomeration of the antiblocking agent is a Venturi nozzle in the conveying line of the antiblocking agent, in which the energy required for deagglomeration is generated in the form of shear forces, by means of high air velocities. For this purpose, the conveying gas (conveying air) is fed into the Venturi nozzle and the antiblocking agent is fed simultaneously into the Venturi nozzle.

The process variants mentioned for deagglomeration can also be combined with one another in any desired manner.

Preferably, the particle size of the antiblocking agent after the deagglomeration step is 0.01 to 5 μm, more preferably 0.05 to 1 μm, mean particle diameter in each case. In the case of extrudates, preference is given to deagglomeration (comminution) to a particle size of 2 to 60 μm. The particle size of the antiblocking agent after the deagglomeration step can be measured by means of laser granulometry and is reported as the mean particle diameter. The mean particle diameter can be determined with the antiblocking agent particles suspended in water by means of a scattered light measurement in a Beckman Coulter LS 230 laser particle analyzer. The particle size can also be estimated by means of scanning electron microscopy (SEM).

It is the aim of the process according to the invention that the agglomerates are deagglomerated in maximum proportions. At least 50% by weight of the agglomerates should be deagglomerated, preferably 80 to 100% by weight, most preferably about 100% by weight.

The procedure in the drying of the corresponding aqueous polymer dispersions may also be such that one or more antiblocking agents in agglomerate form is/are supplied to the spray-drying with one or more nonagglomerated antiblocking agents. This measure may in some cases promote the deagglomeration, for example when an impact plate is used.

Antiblocking agent in nonagglomerated form can also be added to the dry polymer powder after the spray-drying. For example, this addition may follow the powder separation from the drying air, for example the filter precipitation and/or cyclone precipitation.

In the case of dryers with rotary atomizers (rotary atomization dryers, disk dryers), the introduction of the antiblocking agent into the drying air (hot air) is preferred. This is especially true of spray dryers with very high throughputs, since homogeneous distribution of the antiblocking agent via a metering means at the dryer wall or at the dryer roof is difficult at a high loading of the dryer.

The following examples serve to further illustrate the invention:

Example 1

Figure 1:
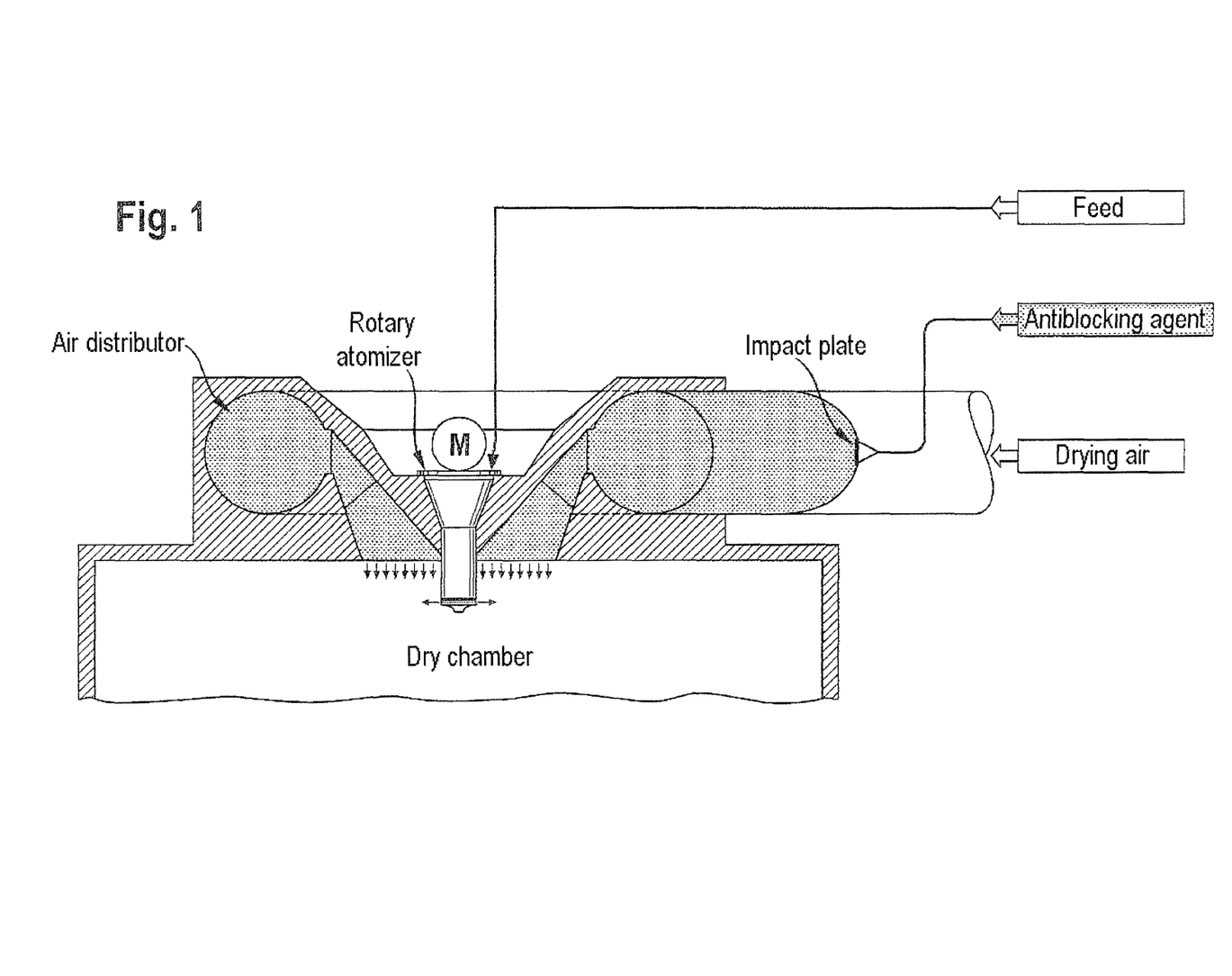
FIG. 1 is a schematic representation of an exemplary spray-drying tower with installed rotary atomizer (rotary atomization dryer) suitable for use according to the invention.

In a commercial spray-drying tower with installed rotary atomizer (rotary atomization dryer) having a perforated disk (atomizer disk) analogous to FIG. 1 (volume of the spray-drying tower about 500 m$^3$, feed rate about 4200 kg/h, peripheral speed of the atomizer disk about 140 m/s, drying air rate about 50 000 m$^3$/h, conveying gas velocity for ABA 40 m/s, drying air inlet temperature about 160° C., drying air outlet temperature about 80° C.), an aqueous vinyl acetate/ethylene dispersion (polymer composition 80% by weight of vinyl acetate and 20% by weight of ethylene, solids content of the dispersion 52% by weight) was spray-dried after addition of 10% by weight, based on copolymer, of an aqueous polyvinyl alcohol solution having a Höppler viscosity of 4 mPas (in 4% aqueous solution, Höppler method at 20° C., DIN 53015) and a hydrolysis level of 88 mol %. In the course of this, the feed viscosity was adjusted by means of dilution water to 400 to 500 mPas (measured at 20° C. by means of a rotary viscometer at 20 rpm). The feed was preheated to 95° C. In the hot air channel of the dryer, over the entire spray-drying operation, a 1:1 mixture of kaolin (Burgess No.-20-SD®) and calcium carbonate (Omyacarb® 5GU) was metered in in a total amount of 10% by weight, based on copolymer and polyvinyl alcohol, in such a way that this mixture was directed onto an impact plate present in the hot air channel (circular steel plate having diameter 15 cm) (see FIG. 1). The kaolin was present here in the form of spray-dried agglomerates having a mean agglomerate size of 100 μm (determined by means of laser granulometry). The calcium carbonate was in nonagglomerated form having a mean particle size of 5 μm.

The spray-drying was effected without any problem over 2 days and gave a free-flowing, blocking-stable powder. No caking was observed at the dryer wall. The amount of oversize, which was defined as powder particles larger than 1000 μm (those which are retained by a sieve having a mesh size of 1000 μm), was 0.5% by weight, based on the overall yield of polymer powder. By means of scanning electron microscopy, it was possible to verify that the kaolin effectively covers the particle surface of the polymer powder. The kaolin was in the form of primary particles having a particle size of about 0.5 to 1 µm (estimated from SEM images).

Comparative Example 1

The procedure was as in example 1, except that the impact plate present in the hot air channel was deinstalled.

It was still possible to conduct the spray-drying without interruption over the period of 2 days, but the amount of oversize (powder particles larger than 1000 µm) was 3.1% by weight). In addition, inspection of the dryer after the end of the drying showed distinct wall coverage.

Scanning electron microscopy showed much poorer coverage of the particle surface of the polymer powder with antiblocking agent. Many kaolin agglomerates having particle sizes of at least 20 µm were present (estimated from SEM images).

Comparative Example 2

The procedure was as in example 1, except that the kaolin was used already in ground form and the impact plate was deinstalled. The drying ran without any problem over 2 days and gave free-flowing, blocking-stable powders. The amount of oversize (powder particles larger than 1000 µm) was 0.7% by weight, based on the overall yield of polymer powder.

A disadvantage of this procedure was found to be significant bridge formation in the ground kaolin in the storage silo, which necessitated frequent mechanical deaggregation. In addition, the conveyability of the kaolin by means of screw metering was found to be difficult, which led to a less constant metering rate and therefore higher monitoring intensity.

Example 2

The procedure was as in example 1, except that, during the spray-drying, both finely divided silica (HDK® H20) and calcium carbonate (Omyacarb® 5GU) were added. The silica here was in the form of agglomerates having a mean agglomerate size of 10 to 250 µm. The calcium carbonate was in nonagglomerated form having a mean particle size of 5 µm. Determined in each case by means of laser granulometry.

Figure 2:
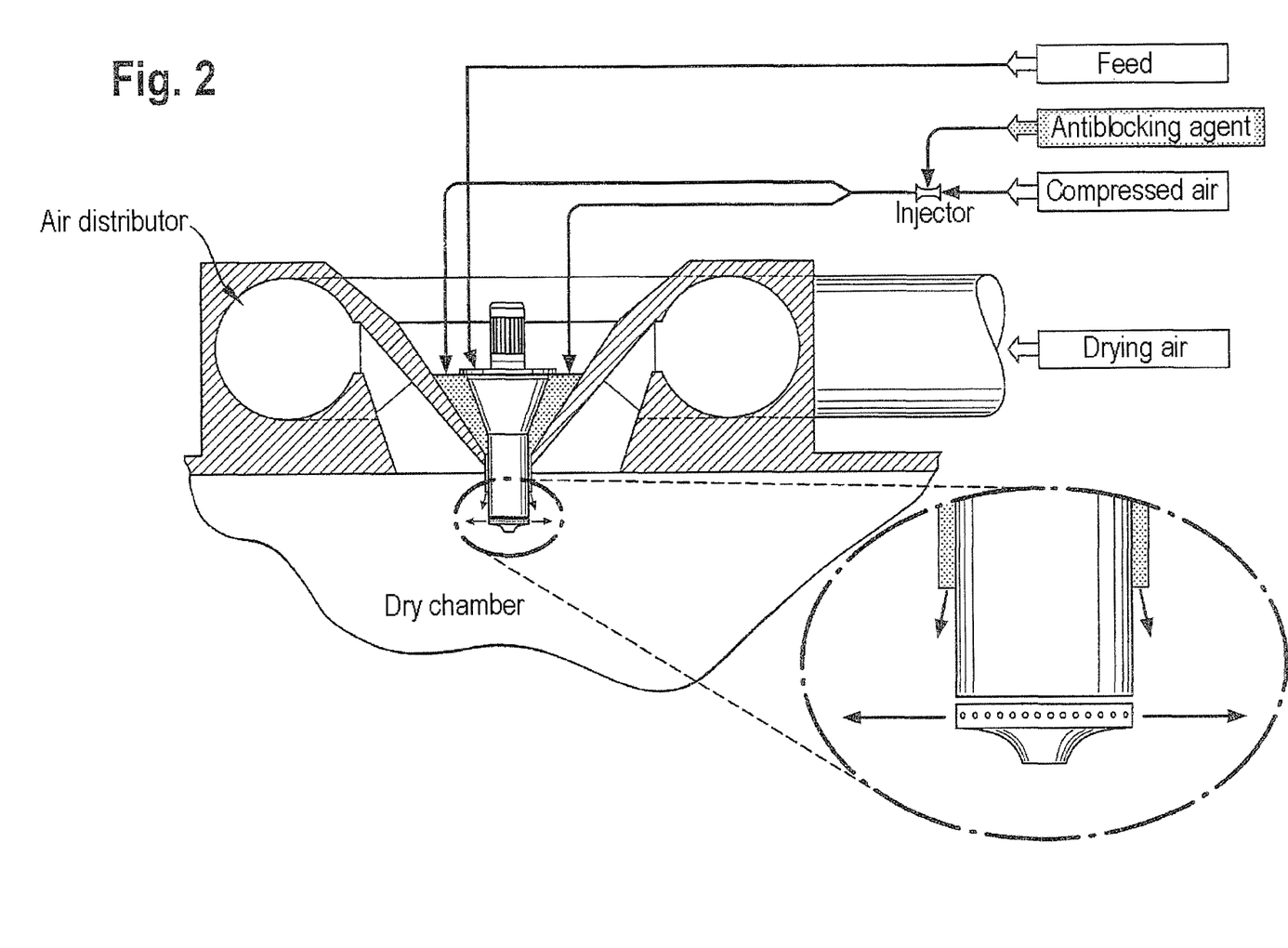
FIG. 2 is a schematic representation of another exemplary spray-drying tower with installed rotary atomizer (rotary atomization dryer) suitable for use according to the invention.

The spray-drying was effected in the spray-drying tower with installed rotary atomizer (rotary atomization dryer) from example 1. In contrast to example 1, the installation of the impact plate in the drying air channel was dispensed with. The compressed air (conveying gas) was fed in via a Venturi nozzle, to which the silica was also added from above (see FIG. 2). The silica was deagglomerated in the antiblocking agent conveying line and introduced into the spray drier via an annular gap which was arranged above the atomizer disk and had a vertical distance from the atomizer disk of 40 cm and a gap width of 4 cm (see FIG. 2). The annular gap was formed by a steel sheet arranged in a cylinder, which fully surrounds the atomizer housing. As in example 1, the calcium carbonate was metered into the dryer via the hot air channel. The metered addition of finely divided silica and of calcium carbonate was effected such that a 1:20 mixture of finely divided silica and calcium carbonate in an amount of 10% by weight, based on copolymer and polyvinyl alcohol, was present in the end product.

The spray-drying was effected without any problem over 2 days and gave a free-flowing, blocking-stable powder. Only very little caking, if any, was observed at the dryer wall. The amount of oversize, which is defined as powder particles larger than 1000 µm, was 0.1% by weight, based on the overall yield of polymer powder.

By means of scanning electron microscopy, it was possible to verify that the silica effectively covers the particle surface. The silica was in the form of primary particles having a particle size of about 200 nm (estimated from SEM images).

Comparative Example 3

The procedure was as in example 2, except that the Venturi nozzle was deinstalled.

It was still possible to conduct the spray-drying without interruption for 2 days, but the amount of oversize (powder particles larger than 1000 µm) was 2.5% by weight. In addition, inspection of the dryer after the end of the drying showed much more severe wall coverage compared to example 2.

Scanning electron microscopy showed much poorer and less homogeneous coverage of the particle surface of the polymer powder with antiblocking agent. Many agglomerates of the silica having diameters of well above 20 µm were present (estimated from SEM images).

All these examples make it clear that efficient destruction of the antiblocking agent agglomerates is essential for disruption-free running of the drying process and satisfactory powder quality.

The invention claimed is:

1. A process for producing a dispersion powder by means of spray-drying, in a spray dryer comprising a hot air channel and a drying tower, of an aqueous polymer dispersion and addition of antiblocking agent, wherein one or more antiblocking agents present in agglomerated form and having a particle size of 10 µm to 250 µm, or having a particle size of 5 mm to 5 cm in the case of agglomerates in the form of extrudates, are supplied to the spray dryer wholly or partly by means of a conveying gas in a conveying line and are comminuted to a particle size of 0.01 µm to 5 µm or, in the case of extrudates, to a particle size of 2 µm to 60 µm.

2. The process as claimed in claim 1, wherein the comminution of the one or more antiblocking agents is effected by means of an impact mill installed in the conveying line.

3. The process as claimed in claim 1, wherein the comminution of the one or more antiblocking agents is effected by directing the conveying gas laden with the one or more antiblocking agents onto one or more impact plates.

4. The process as claimed in claim 3, wherein the impact plate(s) is/are mounted in the antiblocking agent conveying line, in the hot air channel and/or in the drying tower.

5. The process as claimed in claim 1, wherein the comminution of the one or more antiblocking agents is effected in a Venturi nozzle.

6. The process as claimed in claim 1, wherein any combination of two or more of the following conditions are met:
  a) comminution is effected by means of an impact mill installed in the conveying line;
  b) comminution is effected by directing the conveying gas laden with the one or more antiblocking agents onto one or more impact plates;
  c) comminution is effected in a Venturi nozzle.

7. The process as claimed in claim 1, wherein all or some of the one or more antiblocking agents is conveyed into the drying tower via the conveying line.

8. The process as claimed in claim 1, wherein all or some of the one or more antiblocking agents is added via the conveying line to hot air supplied for drying in the hot air channel.

9. The process as claimed in claim 1, wherein the one or more antiblocking agents present in agglomerated form is/are supplied to the spray dryer in a mixture with one or more nonagglomerated antiblocking agents.

10. The process as claimed in claim 1, wherein one or more antiblocking agents present in nonagglomerated form is/are added to after the spray-drying.

11. The process as claimed in claim 6, wherein the one or more impact plate(s) is/are mounted in the antiblocking agent conveying line, in the hot air channel and/or in the drying tower.

* * * * *

UNITED STATES PATENT AND TRADEMARK OFFICE
CERTIFICATE OF CORRECTION

PATENT NO. : 9,051,440 B2
APPLICATION NO. : 14/236563
DATED : June 9, 2015
INVENTOR(S) : Michael Herbert et al.

It is certified that error appears in the above-identified patent and that said Letters Patent is hereby corrected as shown below:

In the Claims

Column 11, lines 3-5 Claim 10 should read

-- The process as claimed in claim 1, wherein one or more antiblocking agents present in nonagglomerated form is/are added after the spray-drying. --

Signed and Sealed this
First Day of December, 2015

Michelle K. Lee
*Director of the United States Patent and Trademark Office*